United States Patent Office 2,803,987
Patented Aug. 27, 1957

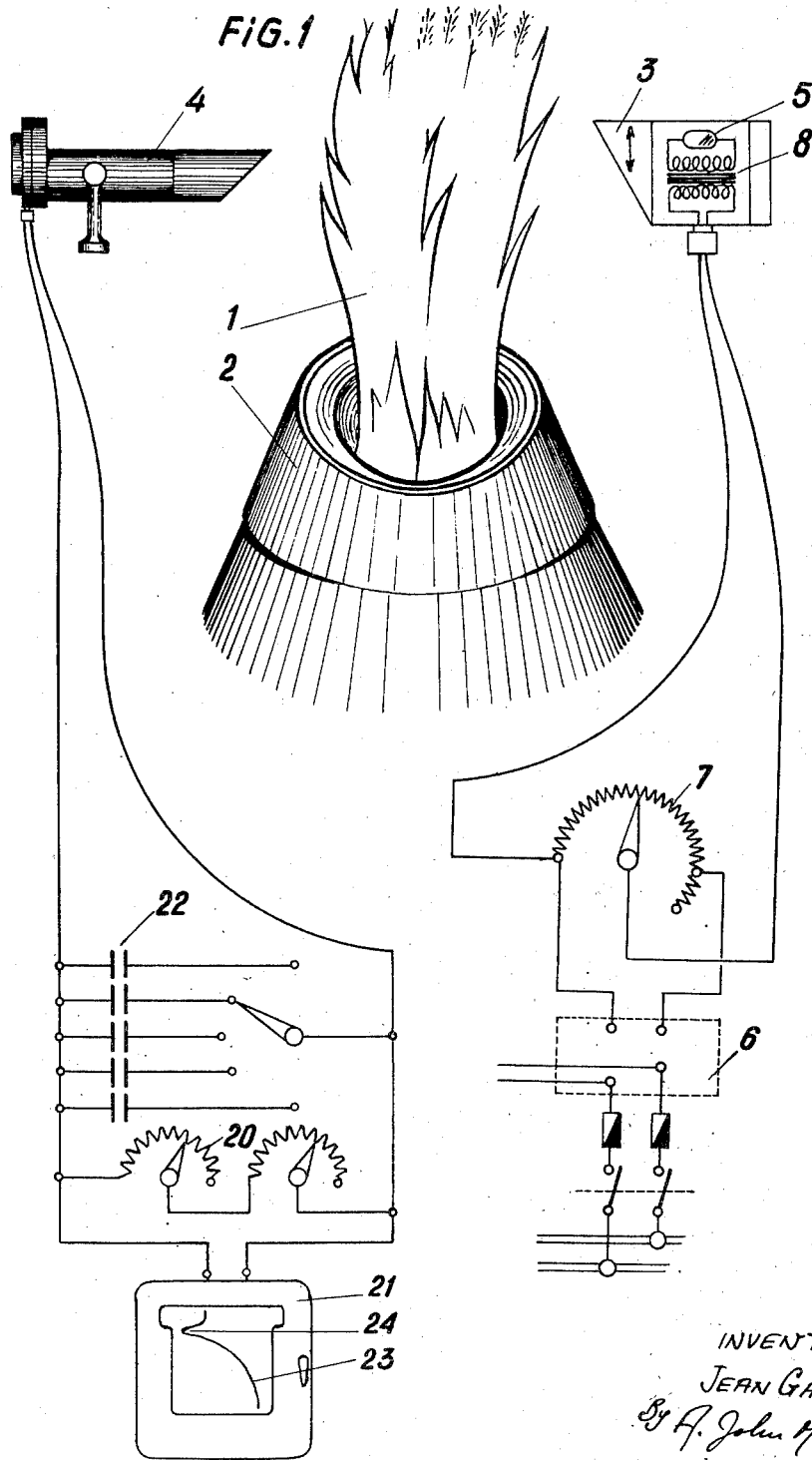

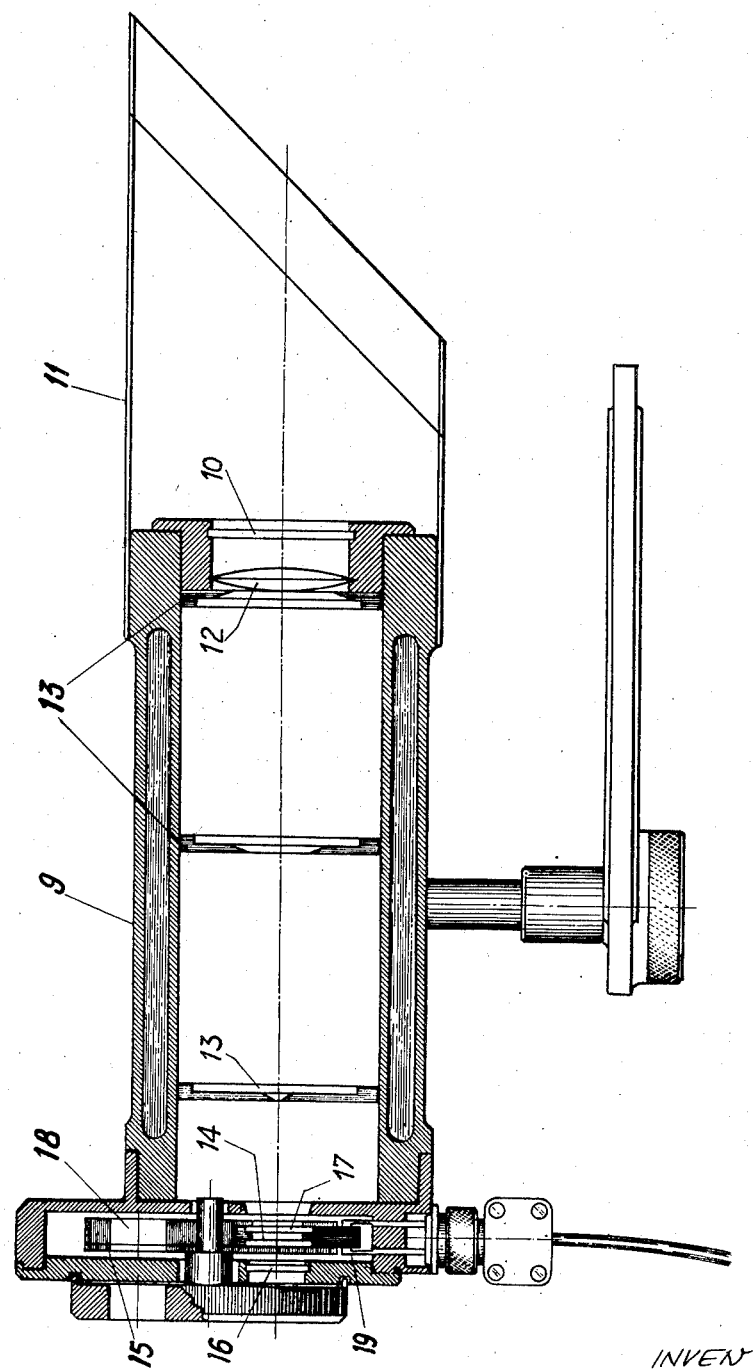

2,803,987

DEVICE FOR MEASURING THE VARIATIONS OF OPACITY OF THE FLAME OF A THOMAS CONVERTER AND AUTOMATICALLY DETERMINING THE END OF THE OPERATION

Jean Galey, Paris, France, assignor to Institut de Recherches de la Siderurgie, Saint-Germain-en-Laye, France, a professional institution Application April 20, 1954, Serial No. 424,478

Claims priority, application France May 4, 1953

6 Claims. (Cl. 88—14)

As it is known, the flame and the fumes of a Thomas converter are the main factors which an operator considers for stopping the blowing at the right time. The temperature of the steel and the state of dephosphoration are experimentally estimated according to the appearance of the flame. The end of the operation is shown by abundant reddish fumes appearing in the flame and a greenish white coloration appearing then at the mouth.

However, an important feature of the flame, which varies rapidly at the end of the operation, has not been scientifically studied up to now. This feature is the transparency or opacity of the flame. In fact, the reddish or green fumes which appear at the end of the operation are due to very fine particles of iron oxide which modify the opacity of the flame.

A main object of the invention is to provide a simple device for measuring the variations of the opacity of the flame of a Thomas converter by means of a recorded graph, for instance.

Another object of the invention is to obtain a signal for stopping the operation when the phosphorus content reaches a predetermined percentage.

Other objects and advantages of the invention will be apparent during the course of the following description.

In the accompanying drawings forming a part of this application:

Fig. 1 shows a Thomas converter equipped with the opacimeter device, and

Fig. 2 is an axial section of the opacity measuring instrument used in said device.

Referring to Fig. 1, there is shown a lamp 3 and a photocell measuring telescope 4 arranged on opposite sides of and approximately at the same distance from the flame 1 of a converter 2.

Owing to the radiations of the flame and the ejections of the converter, the measuring telescope and the light-source should be located at about three meters from the flame. Consequently, the distance between the light-source and the measuring telescope is longer than six meters and, therefore, the field of the measuring telescope must be very small in order to be covered entirely by the image of the light-source. On the other hand, the light-source must have a useful diameter as large as possible, and as the width of the flat filaments of the lamps is usually small, such a light-source diameter can be produced only by a lens properly corrected with a very large useful aperture, which projects the center of the filament in an image of uniform brightness. The lamp itself is mounted in a lantern with said lens protected against dust and ejections by a special glass. The lamp is preferably fed by an A. C. or D. C. electric current of low voltage. In the case of alternating current, a voltage stabilizer and a device to vary said voltage are provided.

The lamp 3 is preferably a projection lantern containing a flat tungsten filament 5 fed by a low alternating voltage through a voltage stabilizer, which is a transformer 6 with saturated iron core, and an auto-transformer 7 for varying the high-voltage of the power station within proper limits, and finally a transformer 8 to lower the voltage.

The lantern 3 is provided with a circular lens the useful diameter of which is as large as possible and sighted by the telescope 4 under a solid angle larger than the solid angle of the field of the telescope. The focal distance of the lens is such that the latter gives a real image of the filament of the lamp having such dimensions to be seen from the telescope under a solid angle larger than the solid angle of the field of said telescope. Finally, the diaphragm of the front lens of the telescope must be entirely included in the field of full light projected by the lens of the lantern. The front portion of this lens is provided with a protecting glass and a cylindrical case in order to be shielded from the ejections and the lateral radiations of the flame.

On the other side of this flame, the telescope 4 has a receiver of radiant energy which may be a photocell fed by a battery or a barrier layer cell. In the case of a photocell fed by a battery, the photocell provided with a red filter, for instance, may be connected to an impedance adapting apparatus constituted by an electronic set with cathodic charge and balanced bridge. Owing to this transformer, it is possible to use an amplifier having a low entrance impedance and to adjust the response time of the pyrometer to the fluctuations of luminosity of the flame. The amplifier makes possible the measure of the voltage in a wide range. The receiver of radiating energy in the example shown in Figure 1 is constituted by a barrier layer cell which makes it possible to do away with the battery and the impedance transformer, and to connect the photocell directly to a recording electronic potentiometer.

The opacity measuring telescope comprises (Fig. 2) an external fluid-cooled jacket 9 having a protecting glass 10 facing the flame 1 and absorbing the radiations to which the cell is not sensitive, whereby the cell is protected from excessive heating. This protecting glass is also protected against ejected particles and the radiations of the flame by a cylindrical tube 11. Behind said protecting glass are arranged consecutively a converging objective lens with a diaphragm, then several other diaphragms 13 for reducing the parasite internal reflexions against the inside of the jacket which is blackened. On the last diaphragm, at the rear, is formed the real image of the lamp filament given by the objective lens of the telescope. Behind this diaphragm, at a suitable distance, is arranged a barrier layer cell 14, the sensitive face of which receives the light-flux that passes through the diaphragm.

The rear portion of the telescope comprises a revolving disc 15 in front of which is a stationary ground glass 16, said disc carrying at least one photocell 14 in front of which is a colored filter 17. It is possible, when the disc is revolved, to bring into the light-flux either one of the photocells or a hole 18 to obtain a correct focus and alignment of the two optical axes of the two devices by means of the ground glass 16.

This arrangement of parts makes it possible to select the range of light-wave length that is most appropriate to the case in consideration. The particular photocell which is working on the disc is automatically connected to the measuring circuit by a metal leaf contact 19.

The electric current from the photocell passes through an adjustable resistance 20, the terminals of which are connected to a recording potentimoeter 21 of a commercial type. An adjustable condenser 22 is mounted in parallel connection with this resistance. The set formed by the resistance and the condenser makes it possible to obtain a time-constant ensuring occasionally the damping of the fluctuations of the flame.

In the above example, the potentiometer is an electronic potentiometer adapted to draw a graph 23 corresponding to the opacity of the flame. Owing to that device, it is observed that the graph drawn by the pen of the recording potentiometer shows values which increase gradually from the start of the dephosphoration period, the graph showing a maximum at 24, then decreasing values, and finally constant values. As it is diagrammatically shown in the drawing, the pen of the recording apparatus draws a sort of protuberance, clearly visible at 24, after which the graph has a level portion. The beginning of that level portion may be used as a stop signal. It corresponds to a final phosphorus content of the steel which varies slightly with the temperature, but may be accepted in general without correction for an ordinary operation. This level portion is the proof that the stop signal corresponds to the moment when the opacity is fixed to a constant value.

It is to be understood that the forms of the invention herewith shown and described are to be taken as preferred examples of the same, and that various changes in the shape, size, and arrangements of parts may be resorted to without departing from the spirit of the invention, or the scope of the subjoined claims.

What I claim is:

1. A device for measuring the variations of the opacity of a flame of a converter, comprising in combination: a light source of substantially constant brightness arranged at one side of the flame; a measuring telescope having a receiver of radiant energy arranged on the other side of the flame and adapted to sight the light-source through said flame, the useful diameter of the light-source being larger than the field of view of the telescope; and recording means connected to the receiver of radiant energy, the recording means being arranged and adapted to record a continuous graph of the variations of the opacity of the flame.

2. The device of claim 1, wherein a colored filter is mounted in said telescope between the flame and the receiver of radiant energy.

3. The device of claim 2, wherein the filter is a red filter.

4. The device of claim 1, wherein said light-source comprises an electric lamp, a circuit connected to said lamp and to an alternating current network, a voltage stabilizer in the circuit and a device for adjusting the voltage of the circuit.

5. The device of claim 1, wherein the radiant energy receiver includes at least one barrier layer cell.

6. The device of claim 5, wherein said recording means is an electronic potentiometer connected to said barrier layer cell.

References Cited in the file of this patent

UNITED STATES PATENTS

| | | |
|---|---|---|
| 2,207,309 | Work | July 9, 1940 |
| 2,360,082 | Stone | Oct. 10, 1944 |
| 2,451,501 | Liben | Oct. 19, 1948 |
| 2,674,155 | Gibson | Apr. 6, 1954 |

FOREIGN PATENTS

| | | |
|---|---|---|
| 1,035,036 | France | Apr. 15, 1953 |